United States Patent
Dietrich et al.

(10) Patent No.: US 12,006,784 B2
(45) Date of Patent: Jun. 11, 2024

(54) DRILLING CHOKE WITH MATCHED ACTUATOR

(71) Applicant: NTDrill Holdings, LLC, Houston, TX (US)

(72) Inventors: Earl Dietrich, Fulshear, TX (US); Christian Leuchtenberg, Singapore (SG); Ian Richard Knight, Magnolia, TX (US)

(73) Assignee: NTDrill Holdings, LLC, Houston, TX (US)

( * ) Notice: Subject to any disclaimer, the term of this patent is extended or adjusted under 35 U.S.C. 154(b) by 330 days.

(21) Appl. No.: 17/155,669

(22) Filed: Jan. 22, 2021

(65) Prior Publication Data

US 2021/0230966 A1 Jul. 29, 2021

Related U.S. Application Data

(60) Provisional application No. 62/964,877, filed on Jan. 23, 2020.

(30) Foreign Application Priority Data

Mar. 23, 2020 (GB) ..................................... 2004170

(51) Int. Cl.
*E21B 34/02* (2006.01)
*E21B 21/08* (2006.01)
(Continued)

(52) U.S. Cl.
CPC ............ *E21B 34/025* (2020.05); *E21B 21/08* (2013.01); *E21B 47/06* (2013.01); *F16K 5/0207* (2013.01); *F16K 5/0407* (2013.01)

(58) Field of Classification Search
CPC ........ E21B 34/025; E21B 34/02; E21B 21/08; E21B 21/10; E21B 47/06; F16K 5/0207;
(Continued)

(56) References Cited

U.S. PATENT DOCUMENTS 1,972,151 A * 9/1934 Link ......................... F16K 5/10
138/44
3,479,006 A * 11/1969 Brown .................... F16K 5/184
251/336
(Continued)

FOREIGN PATENT DOCUMENTS

| CA | 3016989 A1 | 12/2018 |
| GB | 2483671 A | 3/2012 |
| GB | 2541926 A | 3/2017 |

OTHER PUBLICATIONS

Search Report issued in Great Britain Patent Application No. 2004170.3 dated Dec. 7, 2020.
(Continued)

*Primary Examiner* — Craig J Price
*Assistant Examiner* — Andrew J Rost
(74) *Attorney, Agent, or Firm* — MARSHALL, GERSTEIN & BORUN LLP

(57) ABSTRACT

A method of calibrating a choke system includes connecting to the positioner an electronic controller which is programmed to output a control signal representing the desired position of the plug, connecting to the electronic controller a flowmeter which is configured to provide a flow signal representing the rate of flow of fluid from the pump to the inlet and a pressure sensor which is configured to provide a pressure signal representing the fluid pressure at the inlet, connecting the inlet to a reservoir of fluid via a pump which is operable to pump fluid from the reservoir into the inlet at varying flow rates, and using gain scheduling to determine optimum values of proportional gain and integral gain required for control of the choke using a proportional differential and integral controller at a plurality of different rates of flow of fluid along the central flow passage.

11 Claims, 13 Drawing Sheets

(51) Int. Cl.
*E21B 47/06* (2012.01)
*F16K 5/02* (2006.01)
*F16K 5/04* (2006.01)

(58) Field of Classification Search
CPC ........ F16K 5/0407; F16K 5/0471; F16K 5/12; F16K 31/055; F16K 31/535; F16K 37/00; F16K 3/24
See application file for complete search history.

(56) References Cited

U.S. PATENT DOCUMENTS

| | | | | |
|---|---|---|---|---|
| 3,985,150 A | * | 10/1976 | Kindersley | F16K 47/045 251/315.15 |
| 4,231,440 A | * | 11/1980 | Erwin | F16K 5/0442 137/246.22 |
| 5,937,890 A | * | 8/1999 | Marandi | F16K 5/12 137/271 |
| 6,021,812 A | * | 2/2000 | Iwamoto | F16K 5/12 137/625.3 |
| 6,037,304 A | * | 3/2000 | Abdulwahed | B01J 23/002 502/340 |
| 6,109,591 A | * | 8/2000 | Tuttle | F16K 5/12 251/315.01 |
| 8,352,087 B2 | | 1/2013 | Yli-Koski | |
| 9,016,140 B2 | * | 4/2015 | Evans | G01F 1/40 73/861.52 |
| 9,995,098 B2 | | 6/2018 | Brana et al. | |
| 10,047,578 B2 | | 8/2018 | Lovorn et al. | |
| 2009/0032764 A1 | | 2/2009 | Morreale | |
| 2017/0328151 A1 | | 11/2017 | Dillard et al. | |
| 2018/0163489 A1 | | 6/2018 | Dillard et al. | |

OTHER PUBLICATIONS

Office Action, United Kingdom patent application No. GB2004170.3, dated Oct. 20, 2023.

* cited by examiner

DRILLING CHOKE WITH MATCHED ACTUATOR

FIELD OF INVENTION

This invention relates in general to fluid drilling equipment and in particular to a drilling choke to be used for pressurized drilling operations. More specifically, embodiments of the present disclosure relate to a plug design choke with a matched actuator that has an associated calibration curve for optimal performance.

BACKGROUND OF INVENTION

In drilling a well, a drilling tool or "drill bit" is rotated under an axial load within a bore hole. The drill bit is attached to the bottom of a string of threadedly connected tubulars or "drill pipe" located in the bore hole. The drill pipe is rotated at the surface of the well by an applied torque which is transferred by the drill pipe to the drill bit. As the bore hole is drilled, the hole bored by the drill bit is substantially greater than the diameter of the drill pipe. To assist in lubricating the drill bit, drilling fluid or gas is pumped down the drill pipe. The fluid jets out of the drill bit, flowing back up to the surface through the annulus between the wall of the bore hole and the drill pipe.

Conventional oilfield drilling typically uses hydrostatic pressure generated by the density of the drilling fluid or mud in the wellbore in addition to the pressure developed by pumping of the fluid to the borehole. However, some fluid reservoirs are considered economically undrillable with these conventional techniques. New and improved techniques, such as underbalanced drilling and managed pressure drilling, have been used successfully throughout the world. Managed pressure drilling is an adaptive drilling process used to more precisely control the annular pressure profile throughout the wellbore. The annular pressure profile is controlled in such a way that the well is either balanced at all times, or nearly balanced with low change in pressure. Underbalanced drilling is drilling with the hydrostatic head of the drilling fluid intentionally designed to be lower than the pressure of the formations being drilled. The hydrostatic head of the fluid may naturally be less than the formation pressure, or it can be induced.

Rotating control devices provide a means of sealing off the annulus around the drill pipe as the drill pipe rotates and translates axially down the well while including a side outlet through which the return drilling fluid is diverted. Such rotating control devices may also be referred to as rotating blow out preventers, rotating diverters or drilling heads. These units generally comprise a stationary housing or bowl including a side outlet for connection to a fluid return line and an inlet flange for locating the unit on a blow out preventer or other drilling stack at the surface of the well bore. Within the bowl, opposite the inlet flange, is arranged a rotatable assembly such as anti-friction bearings which allow the drill pipe, located through the head, to rotate and slide. The assembly includes a seal onto the drill pipe which is typically made from rubber, polyurethane or other suitable elastomer.

For offshore application on jack-up drilling rigs or floating drilling rigs the rotating control device may be in the form of a cartridge assembly that is latched inside the drilling fluid return riser. In this case the side outlet may be on a separate spool or outlet on the riser.

On the outlet of the rotating device there is usually but not necessarily an isolation valve and from there a line down to a choke manifold on the ground level, a choke in the choke manifold being operated to apply backpressure to the wellbore in order to carry out underbalanced or managed pressure drilling. More recently large diameter control valves of 6 to 8 inches bore have been used directly on the outlet of the rotating control devices. These control valves typically have an actuator driven by air pressure and are limited in wellbore operating pressure as they are utilizing valve design as opposed to choke design.

It is known to provide computerized control of the choke, and in typical systems the flow coefficient of the choke is used to determine how to operate the choke to achieve the desired control of the backpressure. The flow coefficient (Cv) is a dimensionless variable that is related to flow rate of a choke based on the differential pressure produced, and can be provided as an index value equivalent to the gallons per minute of water at standard temperature that will flow through the choke at a pressure differential of 1 Psi across the choke. The flow coefficient character of a choke is typically represented by a plot of flow coefficient versus the degree of opening of the choke.

For example, U.S. Pat. No. 8,352,087 discloses a method and system for controlling a choke in which measured values of the flow rate through the choke and a measured choke opening parameter (which quantifies the extent to which the choke is open) are used in conjunction with the $C_v$ curve for the choke to determine the pressure drop across the choke. A new setpoint value for the choke opening parameter is then calculated from the calculated pressure drop, the desired flow rate, and the inverse of the $C_v$ curve, and the choke adjusted accordingly.

In the system disclosed in U.S. Pat. No. 9,995,098, which relates to the operation of a rig choke for controlling the return flow of fluid during drilling of a wellbore, the computerized controller obtains a measured value of the backpressure, and determines the error between a parameter setpoint such as the backpressure set point or flowrate set point, and the measured parameter such as backpressure or flowrate. The computerized control then uses the flow coefficient character of the choke, and the current position of the choke to determine a correction factor, and determines a position adjustment for the choke by applying the correction factor to the error. The position adjustment for the choke is then applied to the current choke position to determine the new choke position, and the choke moved accordingly.

U.S. Pat. No. 10,047,578 also relates to a method of controlling pressure in a wellbore using a choke, in which the $C_v$ curve for the choke is used to determine the position of the choke needed to achieve the desired backpressure. In this method, the $C_v$ curve for the choke is continuously or periodically recalibrated, during drilling, based on the measured flow rate and pressure drop across the choke.

There exists the need for a compact high pressure, large bore choke that can be mounted directly on the outlet of the rotating control device that is rated at the same pressure rating as the rotating control device which can be up to 5000 psi. Such a unit would ideally be standalone in that it is able to fulfill the same controllability requirements as a choke manifold on the ground while being compact enough to mount directly onto the outlet of the rotating head underneath the drill floor of the drilling unit.

Such a choke would need to be able to work accurately without the need for complicated computer systems as are the norm for full on the ground managed pressure drilling manifolds. It would have additional instrumentation and flowmeter capabilities if required so that it can act as a full replacement for a state-of-the-art managed pressure drilling choke manifold. This is the subject of this invention. The advantageous design also incorporates a novel calibration method of the complete choke assembly which includes the plug choke, gear box and actuator to enable a simple PID (proportional integral derivative) controller to manipulate the backpressure in the well bore as desired by the driller under a variety of operating conditions.

SUMMARY OF INVENTION

This invention relates in general to fluid drilling equipment and in particular to a drilling choke to be used for pressurized drilling operations. More specifically, embodiments of the present disclosure relate to a plug design choke with a matched actuator that has an associated calibration curve for optimal performance. This plug choke with matched actuator is termed a "compact drilling choke" that can be mounted directly on the outlet of a rotating control head.

According a first embodiment we provide a method of calibrating a choke system comprising including a choke having an inlet and an outlet, a central flow passage which extends between the inlet and outlet, and a plug which is movable to vary the degree to which fluid flow along the central flow passage is restricted, the choke system further comprising an actuator which is operable to move the plug to vary the degree to which fluid flow along the central flow passage is restricted, the plug being movable between a closed position in which the plug substantially prevents flow of fluid along the central flow passage and an open position in which flow of fluid along the central flow passage is restricted by the plug to a minimum extent, and a positioner which is configured to receive from an electronic controller a signal representing the desired position of the plug output, the positioner being connected to the actuator and configured to control operation of the actuator so that the plug is moved in accordance with the control signal, the calibration of the choke system comprising:

connecting to the positioner an electronic controller which is programmed to output a control signal representing the desired position of the plug, connecting to the electronic controller a flowmeter which is configured to provide a flow signal representing the rate of flow of fluid from the pump to the inlet and a pressure sensor which is configured to provide a pressure signal representing the fluid pressure at the inlet, connecting the inlet to a reservoir of fluid via a pump which is operable to pump fluid from the reservoir into the inlet at varying flow rates, and using gain scheduling to determine optimum values of proportional gain and integral gain required for control of the choke using a proportional differential and integral controller at a plurality of different rates of flow of fluid along the central flow passage.

Step b may comprise determining optimum values of proportional gain and integral gain at at least ten different rates of flow of fluid along the central flow passage.

Step b may comprise:
b1) creating pressure profiles of the choke system at a plurality of flowrates by, at each of the plurality of flowrates, operating the pump to pump fluid into the inlet at a selected one of the plurality of flowrates, using the controller, positioner and actuator to move the plug from the open position to the closed position and/or vice versa, obtaining from the pressure sensor an indication of the pressure at the inlet when the plug is at a plurality of stages in its movement between the open and closed position, storing each pressure signal and associated stage of movement of the plug as a pressure profile for the selected flowrate.

Step b may further comprise:
b2) using the pressure profiles created in step b1 and the Cv curve for the choke to create, for each of the selected flowrate, a base profile of the proportional gain for a plurality of stages of movement of the plug from its open position to its closed position, and a base profile of the integral gain for a plurality of stages of movement of the plug from its open position to its closed position.

Step b may further comprise:
b3) at each of the selected plurality of flow rates, and whilst using the pressure sensor to monitor the pressure at the inlet, using the controller, positioner and actuator to move the plug to increase the pressure at the inlet by a predetermined increment to a new pressure setpoint, the controller determining the control signal sent to the positioner using a PID control algorithm with the proportional gain and integral gain selected from the base profiles created in step b2, and if, following movement of the plug, the pressure at the inlet deviates from the new pressure setpoint by more than a predetermined amount, adjusting the proportional gain and/or integral gain to create a new P profile and/or I profile, repeating this process until pressure at the inlet does not deviate from the new pressure setpoint by more than a predetermined amount, and then storing the new P profile and new I profile as a calibrated P profile and a calibrated I profile.

According to a second embodiment we provide a method of controlling pressure in a wellbore comprising calibrating a choke system comprising including a choke having an inlet and an outlet, a central flow passage which extends between the inlet and outlet, and a plug which is movable to vary the degree to which fluid flow along the central flow passage is restricted, the choke system further comprising an actuator which is operable to move the plug to vary the degree to which fluid flow along the central flow passage is restricted, the plug being movable between a closed position in which the plug substantially prevents flow of fluid along the central flow passage and an open position in which flow of fluid along the central flow passage is restricted by the plug to a minimum extent, and a positioner which is configured to receive from an electronic controller a signal representing the desired position of the plug output, the positioner being connected to the actuator and configured to control operation of the actuator so that the plug is moved in accordance with the control signal, the calibration of the choke system comprising connecting to the positioner an electronic controller which is programmed to output a control signal representing the desired position of the plug, connecting to the electronic controller a flowmeter which is configured to provide a flow signal representing the rate of flow of fluid from the pump to the inlet and a pressure sensor which is configured to provide a pressure signal representing the fluid pressure at the inlet, connecting the inlet to a reservoir of fluid via a pump which is operable to pump fluid from the reservoir into the inlet at varying flow rates, and using gain scheduling to determine optimum values of proportional gain and integral gain required for control of the choke using a proportional differential and integral controller at a plurality of different rates of flow of fluid along the central flow passage, wherein the method further comprises installing the calibrated choke system in a return line of the drilling system so that the central flow passage forms part of the return line and fluid returning from the wellbore enters the choke system at the inlet, connecting the positioner to an electronic controller which has a memory and which is programmed with a PID algorithm and to send to the positioner an electrical signal representing the desired position of the plug, connecting the controller to a flow meter and a pressure sensor which are configured to send to the controller electrical signals representing the fluid flow rate and fluid pressure at the inlet, wherein the optimum values of the proportional gain and integral gain determined during calibration of the choke system are stored in the memory of the controller, and the controller is programmed to use these, in combination with the signals received from the flow meter and pressure sensor, to select the appropriate proportional gain and integral gain to be used in the PID algorithm in determining the control signal to be sent to the positioner whenever there is a deviation of the measured pressure from the desired pressure at the inlet.

The controller may have an input for receipt of an electrical signal representing the desired pressure at the inlet.

The calibration of the choke system may comprises any feature or combination of features of the calibration method according to the first embodiment.

According to a third embodiment we provide a drilling system comprising a drill string which extends into a wellbore to form an annular space in the wellbore around the drill string, a return fluid flow conduit which is connected to the annular space, a choke system calibrated in accordance with the method of the first embodiment, the choke system comprising a choke having an inlet and an outlet, a central flow passage which extends between the inlet and outlet, and a plug which is movable to vary the degree to which fluid flow along the central flow passage is restricted, the choke system further comprising an actuator which is operable to move the plug to vary the degree to which fluid flow along the central flow passage is restricted, the plug being movable between a closed position in which the plug substantially prevents flow of fluid along the central flow passage and an open position in which flow of fluid along the central flow passage is restricted by the plug to a minimum extent, and a positioner which is configured to receive from an electronic controller a control signal representing the desired position of the plug output, the positioner being connected to the actuator and configured to control operation of the actuator so that the plug is moved in accordance with the control signal, the drilling system further comprising an electronic controller which has a memory and which is programmed with a PID algorithm and to send to the positioner an electrical signal representing the desired position of the plug, a flow meter and a pressure sensor which are connected to the electronic controller and configured to send to the controller electrical signals representing the fluid flow rate and fluid pressure at the inlet, wherein the optimum values of the proportional gain and integral gain determined during calibration of the choke system are stored in the memory of the controller, and the controller is programmed to use these, in combination with the signals received from the flow meter and pressure sensor, to select the appropriate proportional gain and integral gain to be used in the PID algorithm in determining the control signal to be sent to the positioner whenever there is a deviation of the measured pressure from the desired pressure at the inlet.

According to a fourth embodiment we provide a drilling system comprising a drill string which extends into a wellbore to form an annular space in the wellbore around the drill string, a return fluid flow conduit which is connected to the annular space, and a choke system comprising a choke having an inlet and an outlet, a central flow passage which extends between the inlet and outlet, and a plug which is rotatable about an axis of rotation to vary the degree to which fluid flow along the central flow passage is restricted, the choke system further comprising an actuator which is operable to rotate the plug to vary the degree to which fluid flow along the central flow passage is restricted, the plug being movable between a closed position in which the plug substantially prevents flow of fluid along the central flow passage and an open position in which flow of fluid along the central flow passage is restricted by the plug to a minimum extent, the choke being mounted in the return fluid flow conduit so that the central flow passage forms part of the return fluid flow conduit and fluid returning from the wellbore enters the choke system at the inlet, the plug being provided with a plug passage which has a first end and a second end and which is arranged so that when the plug is in its open position, fluid can pass along the central flow passage of the choke from the inlet to the outlet of the choke via the plug passage from the first end of the second end of the plug passage, wherein the plug is provided with a removable plug insert which surrounds the second end of the plug passage.

The plug may be shaped such that the first end of the plug passage is substantially the same size and shape as the central flow passage at the inlet.

The plug insert may be made from a harder material than the rest of the plug.

The plug insert may have an aperture which has an inner end which lies in a central portion between first end and second end of the plug passage and an outer end which lies at the second end of the plug passage, and the plug insert is configured such that the aperture has a smaller cross-sectional area at its outer end than at its inner end. The cross-sectional area of the plug aperture may increase gradually from the outer end to the inner end.

The central flow passage may have a generally circular transverse cross-section and the aperture at the outer end of the plug insert may have a non-circular transverse cross-section.

The aperture at the outer end of the plug insert may be wedge shaped, having a front end, a tail end, a top edge and a bottom edge, the separation between the top edge and the bottom edge increasing from the front end to the tail end of the aperture.

The aperture may be oriented such that when the plug is rotated from its closed position to its open position, the front end of the aperture connects with the central flow passage first, with the tail end of the aperture being exposed to the central flow passage only as the plug reaches the open position.

The plug may be configured such that when rotated from its closed position towards its open position, initially the first end of the plug passage connects to the central flow passage at the inlet side of the choke whilst the second end of the plug passage is not connected to the central flow passage at the outlet side of the choke.

The choke may have a choke body which encloses the central flow passage, the plug being mounted for rotation in the choke body, and a removable downstream insert and upstream insert which surround and engage with the plug to provide bearing surfaces for rotation of the plug relative to choke body, the upstream insert engaging with the plug at the inlet side thereof and the downstream insert engaging with the plug at the outlet side thereof.

The downstream insert may be made from a softer material than the plug insert.

The choke may have a choke body which encloses the central flow passage, the plug being mounted for rotation in the choke body, and a removable bore insert which is mounted in the choke body around the outlet.

The choke may further comprises a removable downstream insert which is mounted in the choke body to engage with the plug at the downstream side thereof, the downstream insert being adjacent the bore insert and between the bore insert and the plug so that the downstream insert and bore insert surround the central flow passage at the outlet side of the plug.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTIONS

The problems being solved, and the solutions provided by the embodiments of the principles of the present inventions are best understood by referring to FIGS. 1 to 13 of the drawings, in which like numbers designate like parts.

Figure 1:
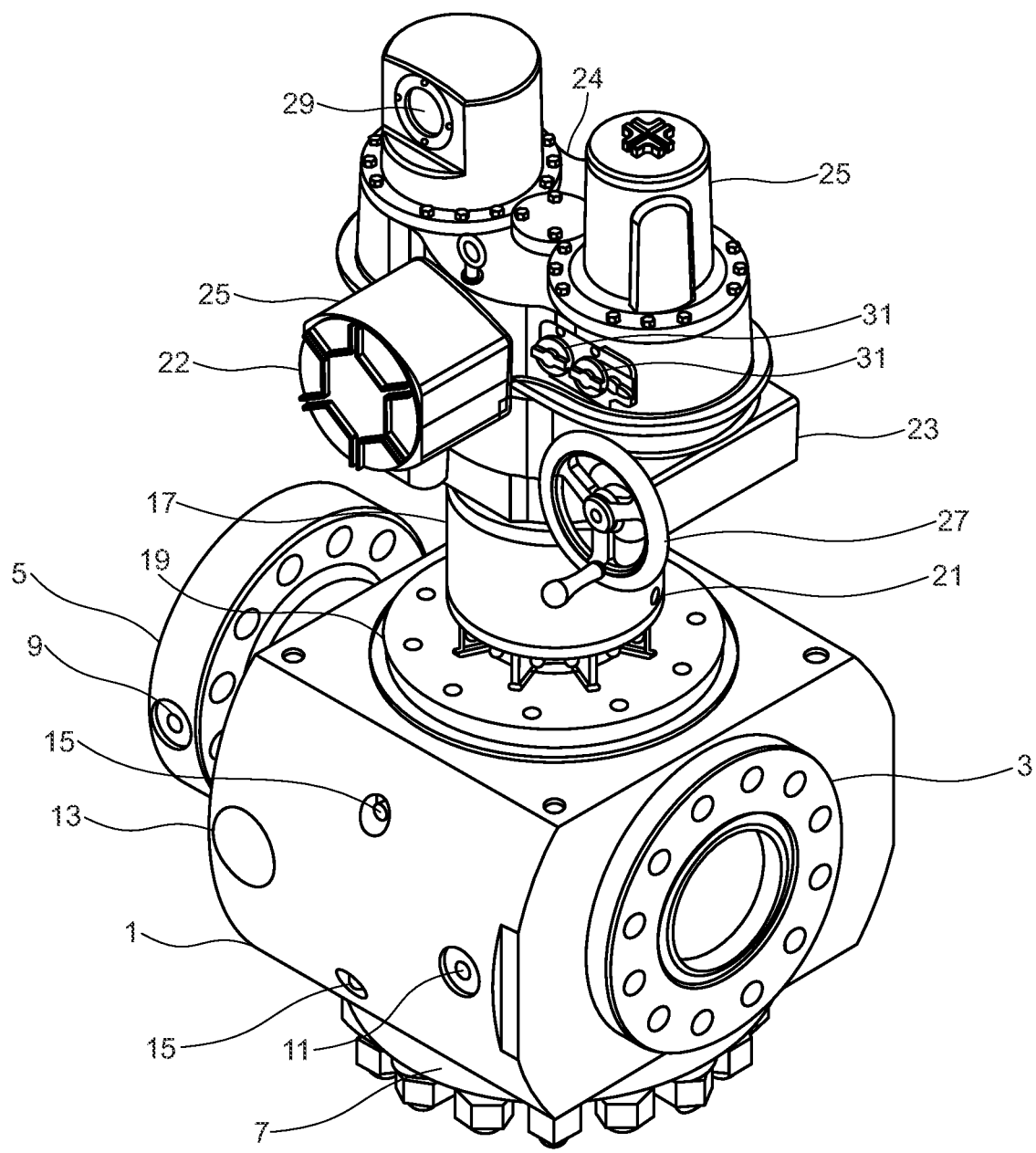
FIG. 1 is an isometric view of the proposed drilling choke with matched actuator.

FIG. 1 is an isometric view of the drilling choke with matched actuator. We have a plug choke body 1 with an outlet 3 and an inlet 5 provided in opposite sides 1a, 1b of the plug choke body 1, in this embodiment, a studded outlet 3 and a flanged inlet 5. The outlet 3 and inlet 5 surround a central flow passage which extends through the plug choke body 1 from the outlet 3 to the inlet 5, and which has a longitudinal axis A.

A bottom face of the plug choke body 1 is formed by a removable lid 7 which, in this example, is bolted to the sides 1a, 1b of the plug choke body 1. Removal of the lid 7 allow access to the internals of the plug choke body 1. A top face 1c of the plug choke body is, in this embodiment, integral with the sides 1a, 1b.

A stem 10 (FIG. 2) of internal choke is engaged by a geared drive 17 that is mounted on a flange 19, in this example on the top face 1c of the plug choke body 1. The geared drive is actuated by an actuator 23 which in this embodiment comprises an electric drive motor 25 driving a gearbox 24. It should be appreciated, however, that any other form of actuator suitable for rotating the geared drive could be used, such as a pneumatic or hydraulically operated actuator. There is a visual position indicator 29 and a handwheel 27 by means of which the stem 10 may be rotated manually if desired. Electrical power is supplied to the drive motor 25 through junction box 22, and two control plugs 31 are provided, by means of which electrical control signals may be communicated to the drive motor 25. There is a low pressure grease port 21 through which lubrication may be supplied to the gearbox, and two high pressure grease ports 15 for the supply of lubricant to the choke. There is an upstream pressure port 9 which is connected to the inlet 5, and a downstream pressure port 11 which is connected to the outlet 3. There is a flow meter port 13 provided in the plug choke body as a placement bore for a flowmeter.

Figure 2:
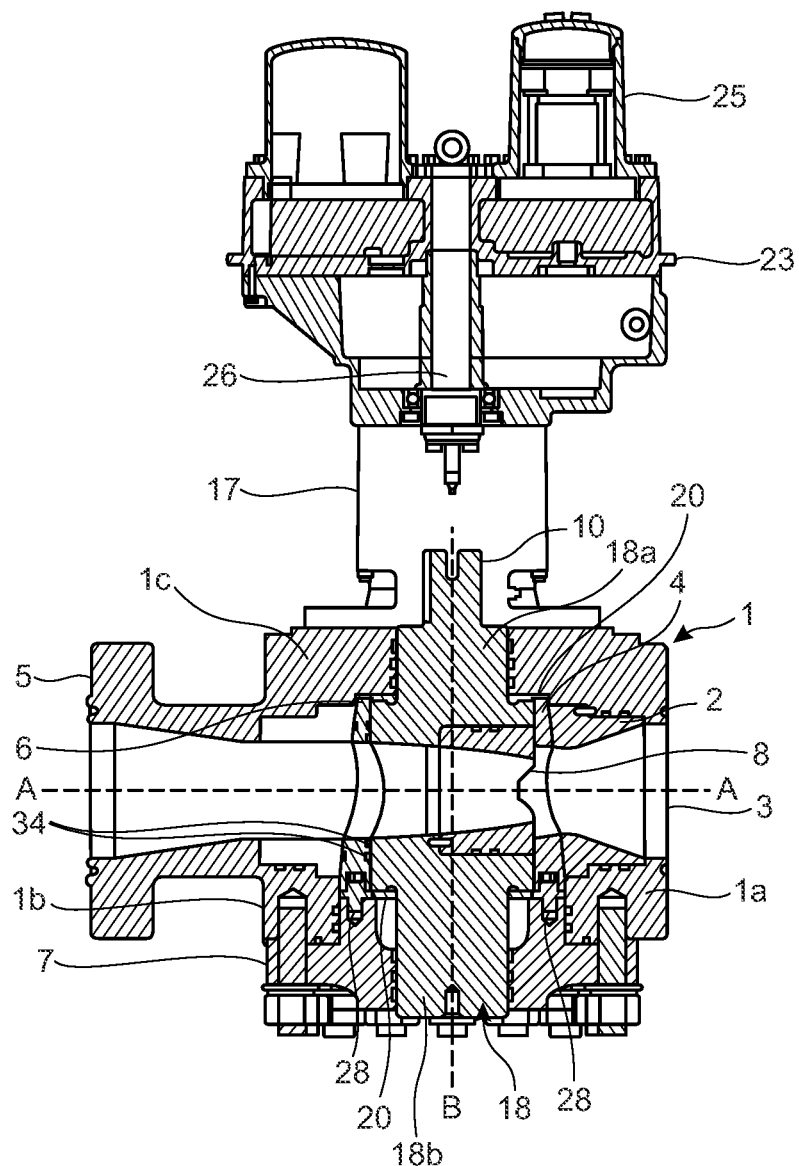
FIG. 2 is cross-sectional view of the proposed drilling choke with matched actuator.

FIG. 2 shows a cross section of FIG. 1 with like parts numbered the same. The electric actuator 23 has a drive shaft 26 that engages with gears in the gear drive 17 (internal not shown) which then turn the plug choke shaft 10. The plug choke is configured as a choke, not a valve by some specific features which are some of the inventive features. It is designed for uni-directional flow from the inlet 5 to the outlet 3, i.e. from left to right in the Figures.

The plug choke comprises a cylindrical plug 18 with a longitudinal cylinder axis B about which the plug choke rotates when driven by the electric actuator 23 via the drive shaft 26 and gear drive 17. A plug passage, through which the fluid flowing through the plug choke passes, extends generally centrally between two ends of the plug 18 generally perpendicular to the cylinder axis B. The plug 18 is rotatable about cylinder axis B between a fully closed position in which the plug passage is generally perpendicular to the central flow passage, and a fully open position in which the plug passage is aligned with the longitudinal axis A of the central flow passage. At the upstream end of the plug passage, the plug passage is substantially the same size and shape as the central flow passage. At the downstream end of the plug passage, a hardened plug insert 8 is mounted in the plug 18 to surround the downstream end of the plug passage, and an aperture in that hardened insert 8 is shaped to provide the desired restriction to the flow of fluid along the plug passage, as will describe in more detail below.

In order to provide the desired flow restriction, the plug insert 8 has an aperture which has an inner end which lies in a central portion of the plug passage, and an outer end which lies at the end of the plug passage closet to the outlet 3. The plug insert is configured such that at the outer end, the aperture has a smaller area than the cross-sectional area of the central flow passage, and the cross-sectional area of the aperture increases from its outer end to its inner end. Moreover, whilst the central flow passage has a generally circular transverse cross-section, the aperture in the plug insert 8 does not. The outer end of the aperture in the plug insert 8 is wedge shaped, having a front end, a tail end, a top edge and a bottom edge, the separation between the top edge and the bottom edge increasing from the front end to the tail end of the aperture. The aperture is oriented in the plug insert 8 such that when the plug 18 is rotated from its fully closed position to its fully open position, the front end of the aperture connects with the central flow passage first, with the tail end of the aperture being exposed to the central flow passage only as the plug 18 reaches its fully open position. In this embodiment, the plug insert 8 is configured such that an imaginary line which lies centrally between the top and bottom edges of the aperture is generally perpendicular to the cylinder axis B and lies generally centrally relative to the central flow passage when the plug 18 is fully open.

The plug 18 is located in the plug choke body 1, so that the cylinder axis B of the plug 18 is perpendicular to and intersects the longitudinal axis A of the central flow passage, and the curved side of plug 18 is fully enclosed by plug choke body 1. An upper end portion 18a of the plug 18 extends through a generally circular aperture provided in the top face 1c of the plug choke body 1, whilst a lower end portion 18b of the plug 18 extends through a generally circular aperture in the lid 7 on the bottom of the plug choke body 1. These apertures are configured so that the top face 1c of the plug choke body 1 and lid 7 supports the plug 18 with the cylinder axis B perpendicular to the longitudinal axis A of the central flow passage, and the top face 1c and lid 7 provide bearing surfaces which allow for rotation of the plug 18 relative to the plug choke body 1 about the cylinder B. The stem 10 extends from the upper portion 18a of the plug 18, and is therefore located outside the plug choke body 1, for engagement with the geared drive 17 which is secured to the top face 1c of the plug choke body 1. Seals may be provided between the top face 1c and the upper portion 18a of the plug 18, and between the lid 7 and the lower portion 18b of the plug 18 to prevent any fluid entering the space between the upper and lower portions 18a, 18b of the plug 18 and the top 1c and lid 7 of the plug choke body 1 from leaking out of the plug choke body 1.

The curved outer surface of the plug 18 engages with two inserts 4, 6 which are mounted in the plug choke body 1, and which provide a substantially fluid tight seal between the plug choke body 1 and the plug 18, thus ensuring that substantially all fluid passing along the central flow passage passes along the plug passage and minimizes leakage into the space between the upper and lower portions 18a, 18b of the plug 18 and the top 1c and lid 7 of the plug choke body 1. These inserts 4, 6 together form a split tube with a radially inwardly facing surface which encloses a cylindrical space, and a tapered radially outwardly facing surface. As such, the outer diameter of the tube formed by the inserts 4, 6 is greater at one end than the other. The inserts 4, 6 are arranged such that the larger outer diameter end of the inserts 4, 6 is adjacent lid 7, whilst the smaller outer diameter end of the inserts 4, 6 is adjacent the top face 1c of the plug choke body 1. The two inserts 4, 6 are configured so that when separated, the tube they form when together is split longitudinally. As such, one of the inserts 4 is a downstream insert which provides a bearing surface for the curved side of the plug 18 at the downstream side of the plug 18, i.e. at the side of the plug 18 adjacent the outlet 3, and the other is an upstream insert 6 which provides a bearing surface for the curved side of the plug 18 at the upstream side of the plug 18, i.e. at the side of the plug 18 closest to the inlet 5. Each insert 4, 6 is provided with an aperture which is the same shape and size as and aligned with the central flow passage through the plug choke body 1. The inserts 4, 6 do not, therefore impede or obstruct flow of fluid along the central flow passage. The downstream insert 4 has a sacrificial surface that can be preferentially eroded during use without affecting the choke characteristic. This is an inventive feature of this design.

The interfaces between the upstream 6 and the plug choke body 18 and the interface between the upstream insert 6 and the upstream side of the plug 18 are sealed by annular seals 34, 35 which are mounted in the upstream 6 in grooves which form a loop around the aperture in the upstream insert 6. On the downstream side, where the pressure control and pressure drop occurs between the plug insert 8 and the downstream insert 4, the interface is metal to metal and no seals are provided between the downstream insert 4 and the plug 18, or the hardened insert 8. This interface may also be ceramic—metal, metal-ceramic or ceramic-ceramic depending on what material is used for the downstream insert, 4 or hardened insert 8. Typically, these parts 4, 8 could be made from Stellite, Tungsten Carbide or other materials used for chokes to increase the longevity and toughness of the pressure drop interface. The side 1b of the plug choke body 1 around the outlet 3 is protected by a bore insert 2 that surrounds the central flow passage at the downstream side of the plug 18, and engages with the downstream insert 4. A seal is, in this embodiment, is provided between the bore insert 2 and the downstream insert 4, and is in this example located in a groove provided in the bore insert 2. The bore insert 2 is made of hardened material and sealed to the plug choke body 1.

The inserts 4, 6 are secured in place by multiple retainer mechanisms 28. There are spacer rings 20 for centralizing the plug within the bore. In this embodiment, the upper and lower end portions 18a, 18b of the plug 18 have a smaller outer diameter than a central portion 18c of the plug 18 through which the plug passage extends. As such, there is an upper shoulder between the upper end portion 18a and the central portion 18c, and a lower shoulder between the lower end portion 18b and the central portion 18c. In this embodiment, the spacer rings 20 are located between the upper shoulder and the top face 1c of the plug choke body 1, and between the lower shoulder and the lid 7.

Figure 3:
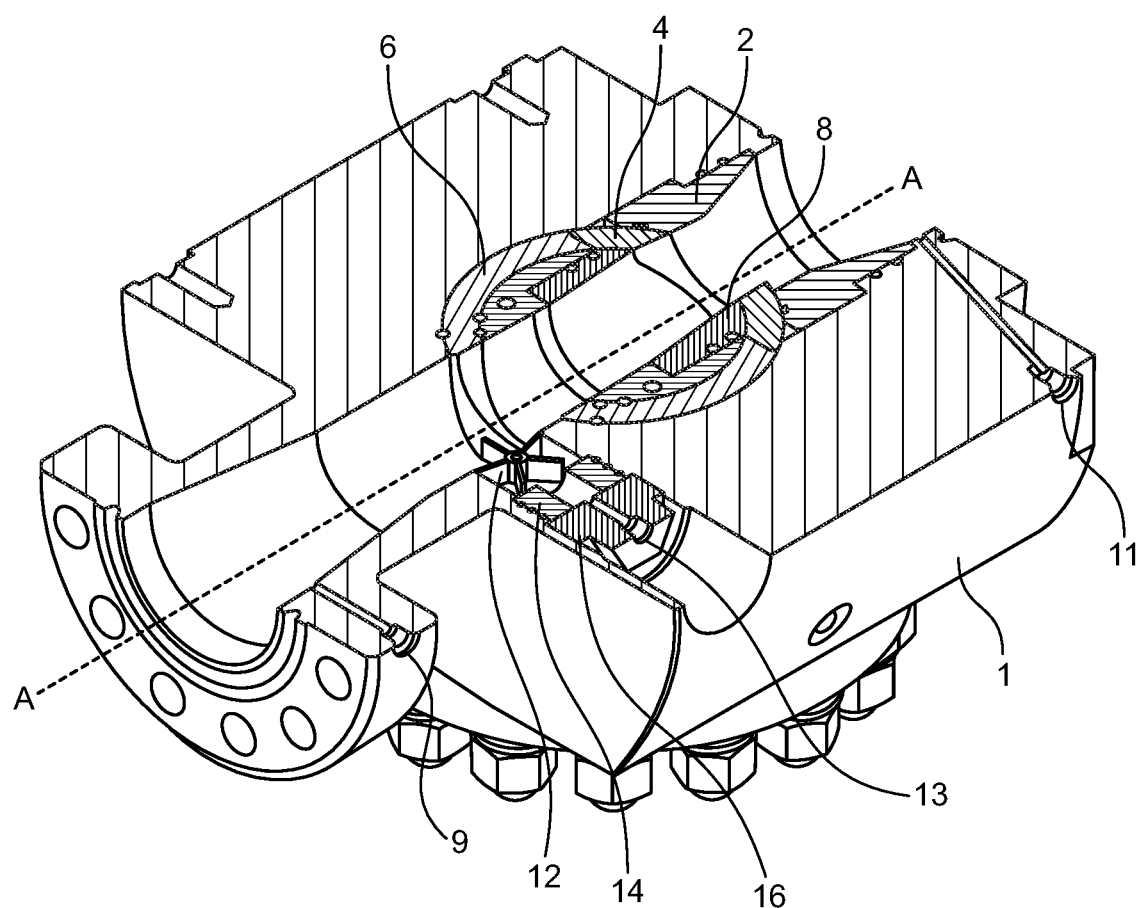
FIG. 3 is a half section of the proposed drilling choke with additional embodiments.

Referring now to FIG. 3 we show a perspective view of a transverse cross-section through the plug choke body 1, and plug 18 perpendicular to the cylinder axis B of the plug 18. This drawing serves to illustrate the accessories which are the ports 9 and 11 which could be used to measure pressure and/or differential pressure across the choke. Port 9 extends through the plug choke body 1 into the central flow passage adjacent to the inlet 5, and therefore a pressure sensor connected to port 9 measures the fluid pressure upstream of the plug 18. Port 11 extends through the plug choke housing 1 into the central flow passage adjacent to the outlet 3, and therefore a pressure sensor connector to port 11 measures the fluid pressure downstream of the plug 18. In this embodiment, a paddle type flowmeter is shown installed in a flowmeter access port 13 which extends through a side of the plug choke body 1 from the exterior of the plug choke body 1 into the central flow passage, in this example, generally perpendicular to the cylinder axis B, and the longitudinal axis A of the central flow passage. The flow meter consisting of rotor 12 which extends into the central flow passage, a seal carrier and a sensor 16 which measures the speed of rotation of the rotor 12.

Figure 4A:
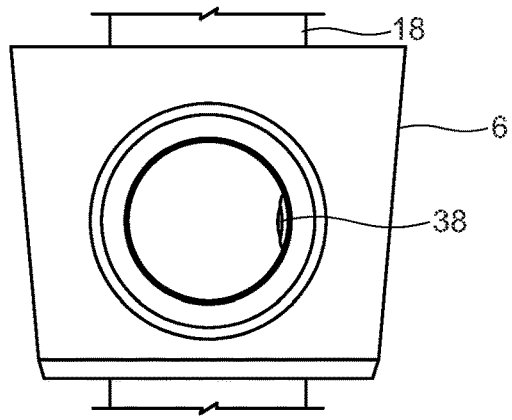
FIGS. 4a to 4c are schematic depictions of the choke in the 27 deg position.
Figure 4B:
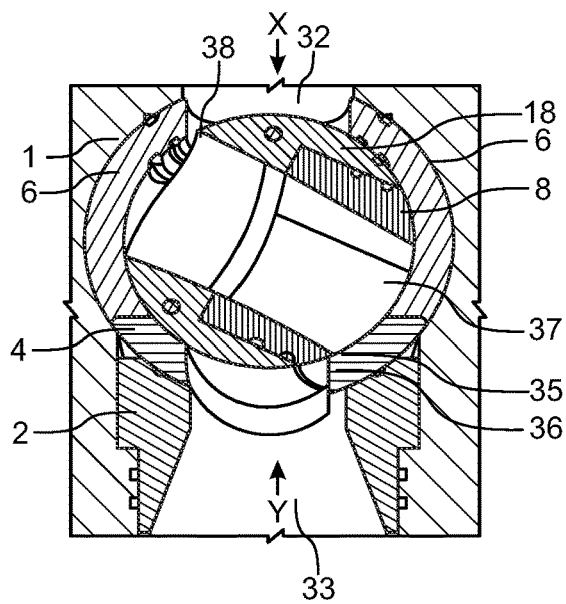

The following FIGS. 4 to 6 will explain the novel choke features. In FIG. 4b we show a partial transverse cross section of the plug choke body 1 (i.e. perpendicular to the cylinder axis B), with the upstream side of the central flow passage labelled 32 and downstream side of the central flow passage labelled 33. The plug 18 has been partially rotated by the actuator in a clockwise direction by 27°. A side view of the upstream insert 6 and plug 18 in the direction of arrow X in FIG. 4b is illustrated in FIG. 4a, and a side view of the downstream insert 4 and plug 18 in the direction Y in FIG.

Figure 4C:
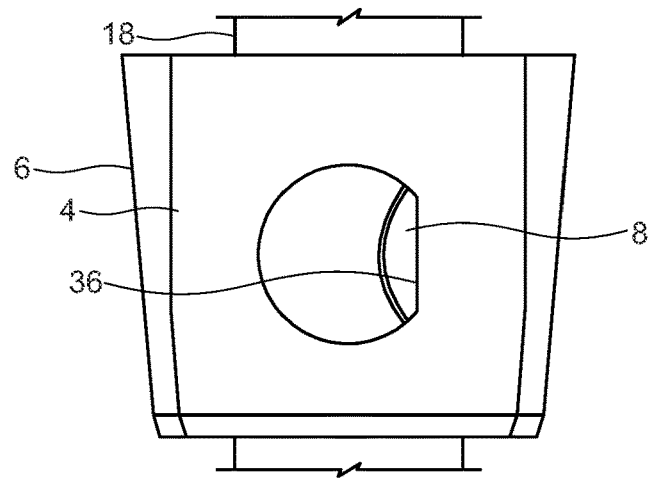

4b is illustrated in FIG. 4c. FIGS. 4a and 4c also shown the configuration when the plug 18 has been rotated by 27° in a clockwise direction.

The upstream insert 6 is usually made of a softer material like Nickel Aluminum Bronze that acts as a bearing surface. The downstream insert 4 and the plug insert 8 are made of harder materials like a high-performance stainless steel with nitride surface treatment, stellite, tungsten carbide or a ceramic. Choking occurs across the interface 35 between the plug 18 and the downstream insert 4. The bore insert 2 acts as a body saver and can be made from the same material as the plug choke body 1 or something more erosion resistant. It serves the same function as a choke bean on an adjustable choke with cone choke as commonly used in the industry. The downstream insert 4 has a sacrificial edge 36 that is designed to erode as the choke is used. Advantageously this erosion does not significantly affect the performance characteristics of the choke. Eventually the erosion will penetrate to the bore insert 2, which can handle significant further erosion without damaging the main body 1. Thus, this design is a plug choke as opposed to a plug valve. The inner surface 37 of the plug insert 8 is specifically shaped to give the required choke characteristic. To ensure that the choking occurs at interface 35 and not upstream, the plug insert 8 is shaped such that it does not open across the interface 35 before significant area 38 has opened upstream as can be further seen in FIG. 4A. Looking at FIG. 4B we can see that no open surface has been created at this clocking of 27°. The plug passage is connected to the upstream side 32 of the central flow passage, and so fluid can enter the plug passage, but, as front end of the aperture in the plug insert 8 is close to the sacrificial edge 36 of the downstream insert 4, but has not yet passed it, the aperture 8 in the plug insert is covered by the upstream insert 6 and downstream insert 4 and fluid in the plug passage is blocked from leaving the plug insert 8 to enter the downstream side 33 of the central flow passage. This ensures that no flow occurs upstream before a substantial area is open to eliminate or minimize erosion in this area. This is an inventive feature of this design.

Figure 5A:
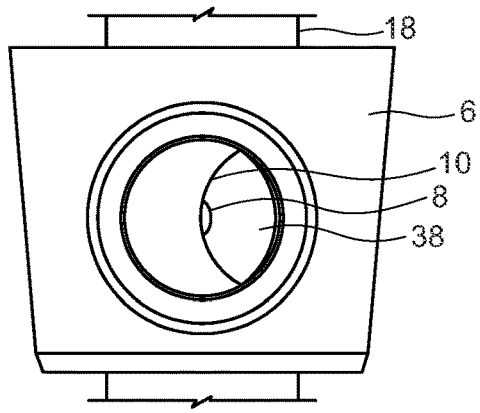
FIGS. 5a to 5c are schematic depictions of the choke in the 57 deg position.
Figure 5B:
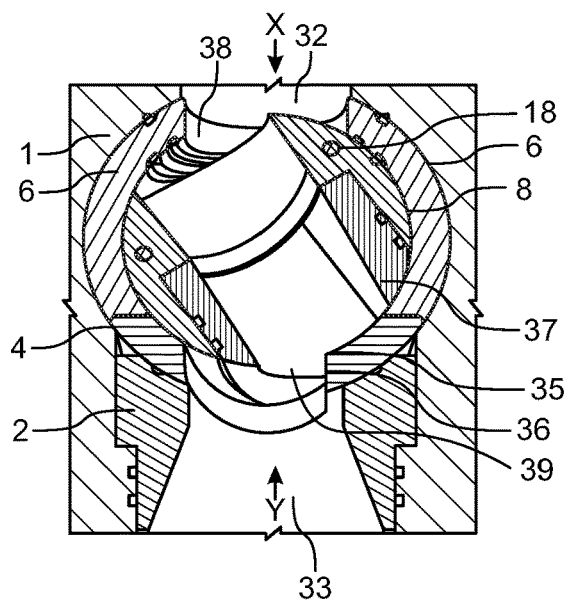
Figure 5C:
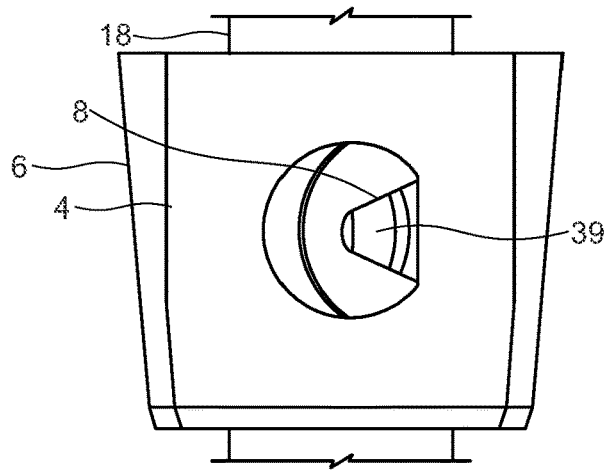

In FIGS. 5a to 5c we show the plug 18 rotated through 57° clockwise from the fully closed position. In this position, the front end of the aperture in the plug insert 8 has passed the sacrificial edge 36 of the downstream insert 4 and so fluid in the plug passage can now escape into the downstream side 33 of the central flow passage, but much greater upstream flow area 38 has opened at the upstream end of the plug passage, much bigger than the downstream area 39 which is the choke point. As such, the plug insert 8 provides the choking effect on the flow. In FIG. 5c the triangular or wedge shaped profile of the aperture in the plug insert 8 is apparent. This serves to give the desired control characteristic of the choke and the area of this profile can be varied to give desired performance while retaining controllability. It will be appreciated that by using a removable plug insert 8 to provide the choking effect on the flow, the control characteristic of the choke can be altered merely by replacing the plug insert 8 with a plug insert with a different size and/or shape aperture.

Figure 6A:
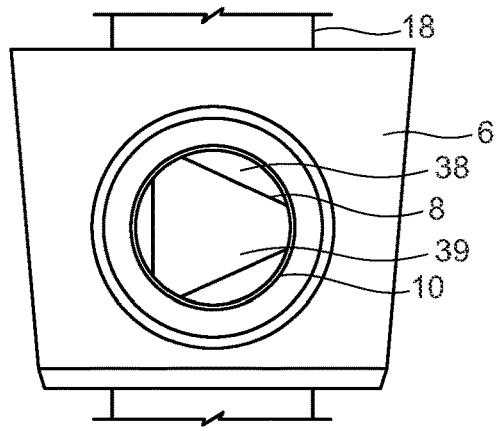
FIGS. 6a to 6c are schematic depictions of the choke in the 90 deg position.
Figure 6B:
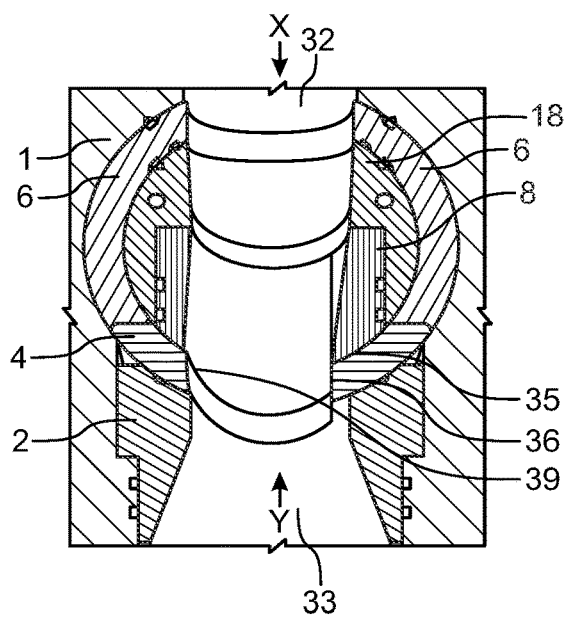
Figure 6C:
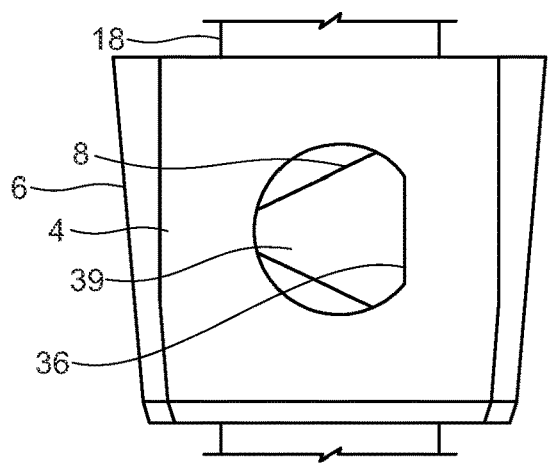

Finally, in FIGS. 6a to 6c the choke is 100% open having clocked to the full 90° rotation, i.e. the fully open position, by the actuator. In this position upstream area 38 is full bore and the tail end of the aperture in the plug insert 8 has finally passed the sacrificial edge 36 of the downstream insert 4, so that the downstream area is also at its maximum opening area 39. This is significantly less than the upstream area 38, however, thus preserving the functionality as a choke. Any wear of the choke will occur partially in the plug insert 8, but primarily on the sacrificial edge 36 of the downstream insert 4. This wear will occur in a slot fashion as dictated by the angular profile of the plug insert and this will not significantly change the inherent performance characteristics of the choke.

It will be appreciated that, by virtue of the wedge shape of the aperture in the plug insert 8, the area available for flow of fluid from the plug passage to the downstream side 33 of the central flow passage increases in a non-linear manner as the plug 18 is rotated. Specifically, by orienting the plug insert such that the front end of the aperture is the thin end of the wedge, when plug 18 is rotated at a constant speed, the rate of increase of flow area increases as the angle through which the plug 18 is rotated increases. The rate of increase of flow area as a function of the angle of rotation can be tailored to the specific requirements of the application in which the choke is to be used by changing the angle between the top and bottom edge of the aperture. For example, if the angle between the top and bottom edge of the aperture is increased, the rate of change of the rate of increase in the available flow area can be increased. Moreover, if it were desired to reduce the rate of increase in the available flow area as the angle of rotation of the plug 18 increases, the plug insert 8 could be orientated such that the thin end of the wedge forms the tail end of the aperture.

Advantageously, the choke is calibrated so that it provides the desired flow characteristics, and a method is described for creating a calibration table for a Proportional-Integral-Derivative (PID) controller that is specific for each plug choke version manufactured. The PID controller is connected to a positioner which converts an electrical control signal representing the desired angle of rotation of the choke plug 18, to an appropriate control signal for the actuator 23. The calibration process is carried out using the entire plug choke system, so that it incorporates the individual characteristics of each of the components comprising the "plug choke system", namely but not limited to: choke body bore, choke plug profile, gearbox, actuator and positioner.

PID control is a control loop mechanism employing feedback and is widely used in industrial control systems, including managed pressure drilling control systems, which are unstable and require continuously modulated control. A PID controller continuously calculates an error value as the difference between a desired process setpoint (SP) and a measured process variable (PV) and applies a correction based on proportional, integral, and derivative terms in accordance with the following equation:

$$u(t) = Pe(t) + I \int_0^t e(t')dt' + D\frac{de(t)}{dt}$$

where u(t) is the control variable at time t, e(t) is the error value at time t, and P, I, and D are coefficients for the proportional, integral and derivative terms—generally referred to as the proportional gain, the integral gain and the derivative gain. The process setpoint and process variable could relate to the fluid pressure upstream of a choke, the fluid flow rate through a choke, or the choke position, and the control variable could be the position of the choke. The coefficients have to be determined for each control application as they depend on the response characteristics of the system to be controlled. Initially estimates for the coefficients are used, and then these are refined, or tuned, by monitoring the system as the setpoint is changed to determine the system response.

In some cases, it is not necessary to use all three terms to achieve appropriate control, and, in this case, the coefficient for the unused term (P, I or D) is set to zero. Also, in some cases, the non-linear relationship between the control variable and the process variable can be such that good control will not be achieved by using the same values of P, I or D over the entire range of operating conditions. In this case, it is known to use carry out gain scheduling of the PID controller. Gain scheduling is a known technique for compensating for nonlinearity in process control, usually by creating a limited set (less than 5) of P, I and D values for different operating conditions that are programmed into the PID controller. In this case, the measured process variable is used to determine the error value, and also to select the values of P, I and D to be used by the PID controller in determining the required adjustment to the control variable. Gain scheduling can also be carried out for any other process variable which effects the ability of the system to reach the desired process setpoint (not just the process variable which corresponds to the process setpoint).

As described above, managed pressure drilling involves the control of the fluid pressure in the annulus by using a choke to restrict flow of fluid out of the annulus, and therefore to apply a surface backpressure to the annulus. In this case, therefore, the control variable is the choke position, and the process variable is the surface backpressure, ie. the fluid pressure at the upstream (annulus) side of the choke. Controlling the pressure in a drilling annulus is, however, a complex problem that requires compensation for the inherent nonlinearly of the activity taking place.

In situ calibration methods of the PID controller can be difficult. Part of the problem is the widely varying ranges of pressures and flowrates that can be encountered in a typical drilling operation. Pressures can typically vary from atmospheric (unchoked flow) to several hundred psi, even reaching higher during unplanned events. Flowrates vary from maximum rates of up to 1800 gpm down to zero when making a drill pipe connection when the drilling pumps need to be shut-off. Another part of the problem is the variation in mechanical resistance of the plug choke under differing conditions i.e. high resistance to movement when under large differential pressure, typically when only a few percent open and relatively easy movement when near full open with low to negligible differential pressures.

Normal process control valves are usually sized for a particular narrowly defined flow rate range, and this allows the control valve to work around an optimal 30 to 70% open range, and so it will be appreciated that valve control over the wide range of operating conditions present in managed pressure drilling is a far more difficult control challenge.

As such a simplistic $C_v$ curve approach is insufficient for calibrating the choke in the return line of a managed pressure drilling system. Many state of the art solutions (such as that disclosed in U.S. Pat. No. 10,047,578) attempt to create a calibrated $C_v$ curve during actual operations which is inherently difficult as the additional variability of the complex drilling circulation is introduced as a constantly changing parameter. Other solutions (such as U.S. Pat. Nos. 9,995,098 and 8,352,087) include using $C_v$ curves calculated or measured during choke manufacturing, without considering the mechanical behavior of the choke when combined with an actuator, or the actuator position as used in a control loop under differing pressure conditions.

This invention relates to a method that calibrates the whole system under controlled, accurate and measured flowrates and pressures. As the plug choke system is treated holistically in this method, the calibration table takes into account all the inherent characteristics of the mechanical linkages involved, including but not limited to backlash, tracking error and stiction.

This method creates an accurate continuous gain scheduling PID calibration table to which further gain scheduling can be added, if required, for the particular managed pressure drilling parameters at the wellsite.

In the current invention, a continuous calibrated curve of P and I values are derived by building a table of PI values, effectively fingerprinting the whole choke system and deriving recommended varying PID controller parameters for the full operating range. It has been found that adequate control can be achieved without the need for the PID controller to use a derivative term, and so this process is not carried out for "D". The P&I values are tabulated over this full operating range of the choke system, based on tracking error in the control objective, and measured process variables, namely flowrate Q, pressure p and choke actuator displacement (z) (which represents the degree of opening of the choke) % open, and interpolated to create continuous calibration curve for P and I, that is then programmed to be available to the PID controller for each possible condition. Note that this is not a $C_v$ curve.

The advantage of such a solution is that we have a completely known and calibrated "choke system" which when installed at the drilling location can have further gain adjustments incorporated that are specific to the drilling conditions like the drilling fluid compressibility, the wellbore volume and therefore inherent wellbore storage characteristics. Other methods described in other patents attempt to do on-site calibrations of the PID controller, but this is less than satisfactory because too many variables are involved in the process (both wellbore and choke characteristics), resulting in unstable control, especially when the wellbore conditions change which is an inherent characteristic of the stop start nature of drilling operations.

Figure 7:
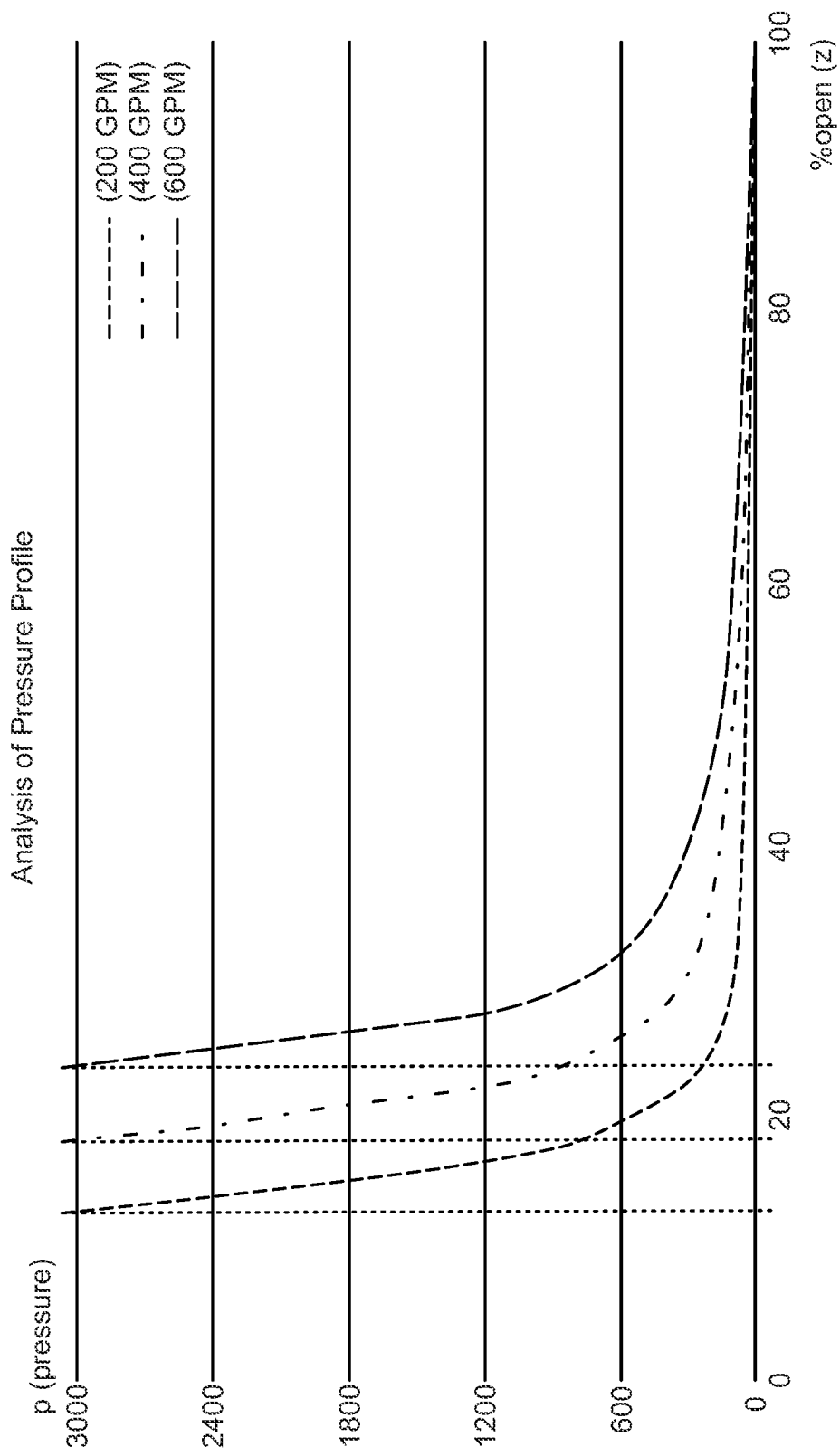
FIG. 7 is a graph showing the analysis of the pressure profile of the compact drilling choke.

The method is described in steps. The simplistic calibration set-up is a pump that has a variable speed drive to create different flow rates measured by a flowmeter and a pressure transducer upstream of the choke assembly. Referring now to FIG. 7:

1) To start the calibration, an initial analysis of the pressure (p) profile characteristic of the complete choke system is created for varying flowrates (Q)

a) The desired flowrate calibration range is determined from 0 to Qmax, then divided into a predetermined number of flow rate steps (n). In FIG. 7, only three rates are shown and used throughout for clarity of explanation, but in reality the flowrate calibration range would be divided into more flow rates, for example 10 more.

b) While holding the flowrate Q constant for each step, the choke is closed in small stepped increments until the pressure in the upstream side 32 of the central flow conduit (which may be measured using a pressure sensor connected to port 9) reaches pmax, the maximum planned operating pressure for the system, creating characteristic curves of upstream pressure (p) versus % Open (z) of the choke. This may be determined from the choke actuator position using a simple calculation based on the angle of rotation of the choke plug and assuming that the % open increases linearly with the angle of rotation from 0 to 90°. As such, when the angle of rotation of the choke plug is zero, the choke is completely closed (0% open), when the angle of rotation is 45°, the choke is deemed to be 50% open, and when the angle of rotation of the choke plug is 90°, the choke is fully open (100% open). Alternatively, where the area available for flow through the choke does not increase linearly with the angle of rotation of the choke, such as in the choke hereinbefore described, an equation which accurately represents relationship between the area available for flow through the choke as a percentage of the maximum area for flow through the choke and the angle of rotation of the choke can be used. This process is repeated for each flowrate point, thus creating a set of characteristic p versus z curves for a plurality of flowrates within the desired flowrate range. In FIG. 7, we have pmax as 3000 psi, set by the system limitation, and three flowrates 200, 400 and 600 gpm showing this process. This creates a set of characteristic p versus z curves. Obviously for a full calibration, the pressure would be measured at many more flowrates, so there would be many more characteristic curves.

2) This procedure from 1)a) and 1)b) is repeated whilst opening the choke in small stepped increments until the choke is fully open (not shown).

3) Based on each of these characteristic curves from steps 1) and 2) the system was then calibrated using an average value of p obtained from the pressures p measured during closing and opening across the 0-100% range and this data recorded. This data is used to create a core reference table which contains p and z values at each flowrate for this particular combination of a choke system consisting of: choke body bore, choke plug profile, gearbox, actuator and positioner. This data is also represented graphically in FIG. 8 (curves for three flow rates only shown for clarity).

Figure 8:
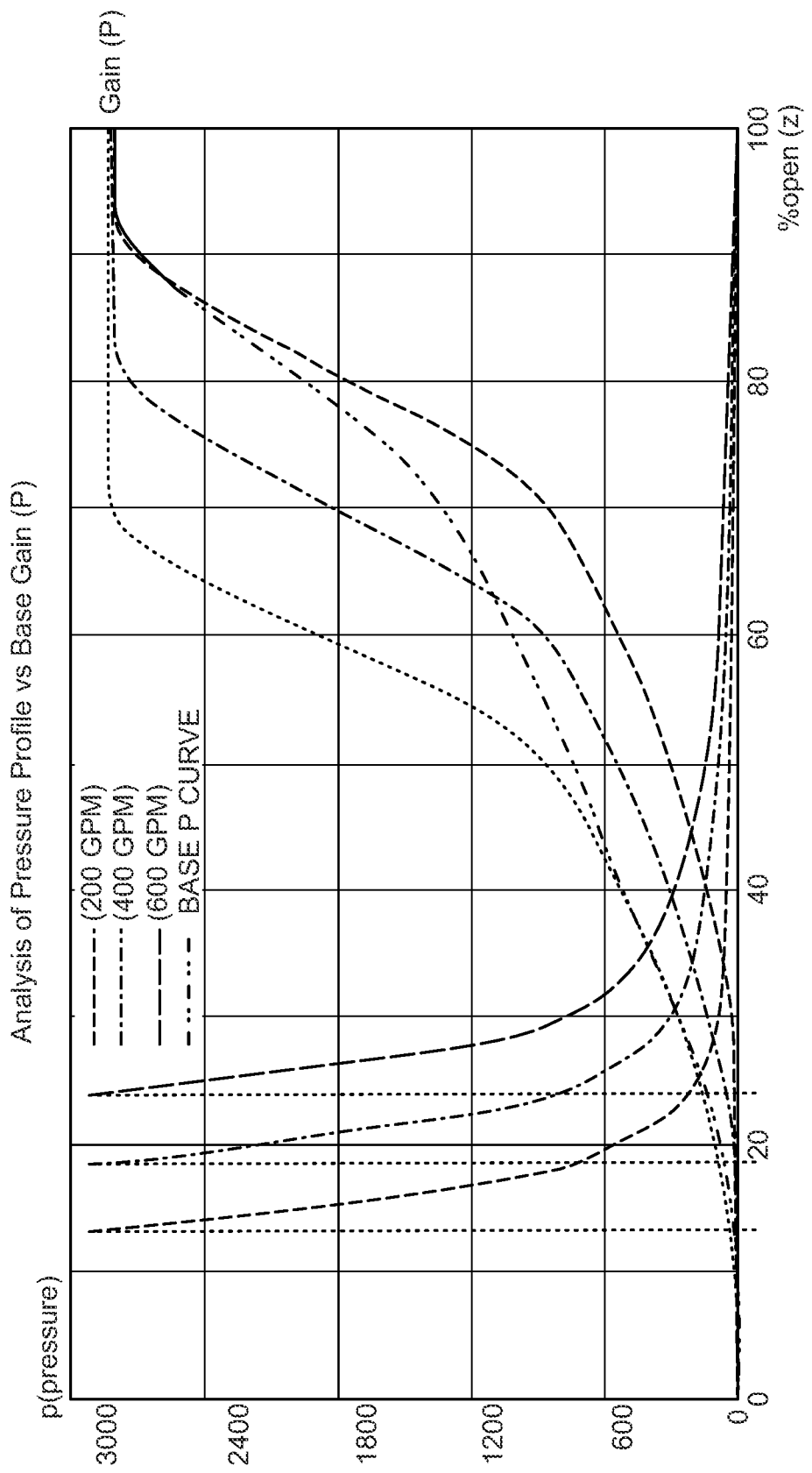
FIG. 8 is a graph showing the analysis of pressure profile versus base integral time.

Referring to FIG. 8 where the pressure profiles versus % open are the averaged values derived from the steps 1) and 2) above (only 3 flowrates shown for clarity), each such average curve is used, in conjunction with the $C_v$ curve for the choke, to obtain an associated proportional gain curve (P). These proportional gain curves (P) are shown starting on the right using the same line pattern as for the flowrates for clarity. Again, only 3 are shown for clarity.

A "BASE P CURVE" is then created by combining the various P curves in a way based on empirical experience, and this is used as the initial calibration curve for the proportional gain (P).

Figure 9:
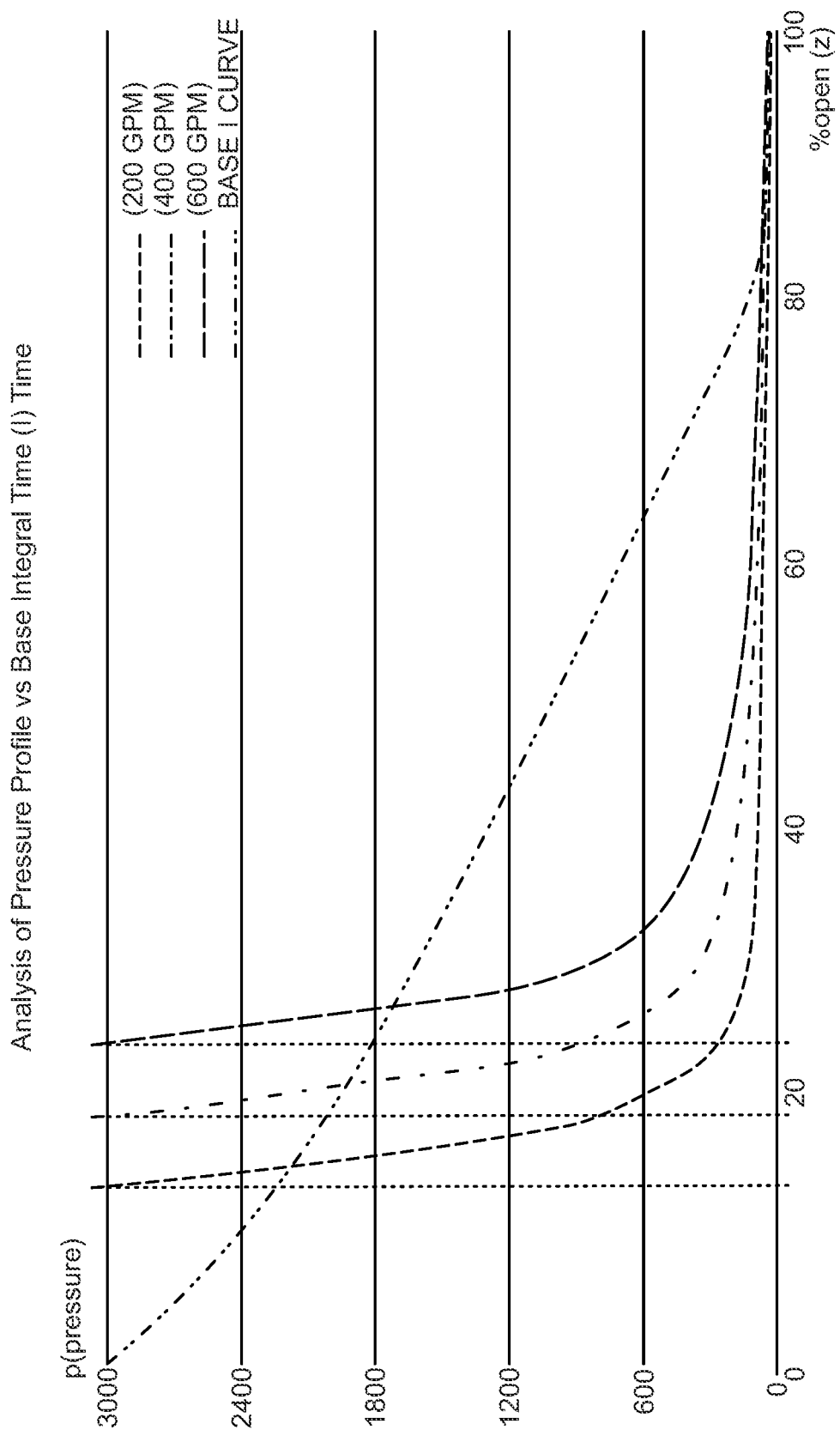
FIG. 9 is a graph showing the analysis of pressure profile versus base gain.

The same process is the carried out in relation to the integral gain I. The averaged pressure profiles versus % open are the derived from the steps 1) and 2) above, as illustrated in FIG. 9 (only 3 flowrates shown for clarity), and these, and the $C_v$ curve for the choke are used to create integral gain curves for each flow rate. An averaged base integral gain curve shown as "BASE I CURVE" is now derived from the multiple Integral curves (not shown in FIG. 9) shown as "BASE I CURVE". For a full calibration this base I curve would be the averaged for all the steps to give a starting calibration.

Figure 10:
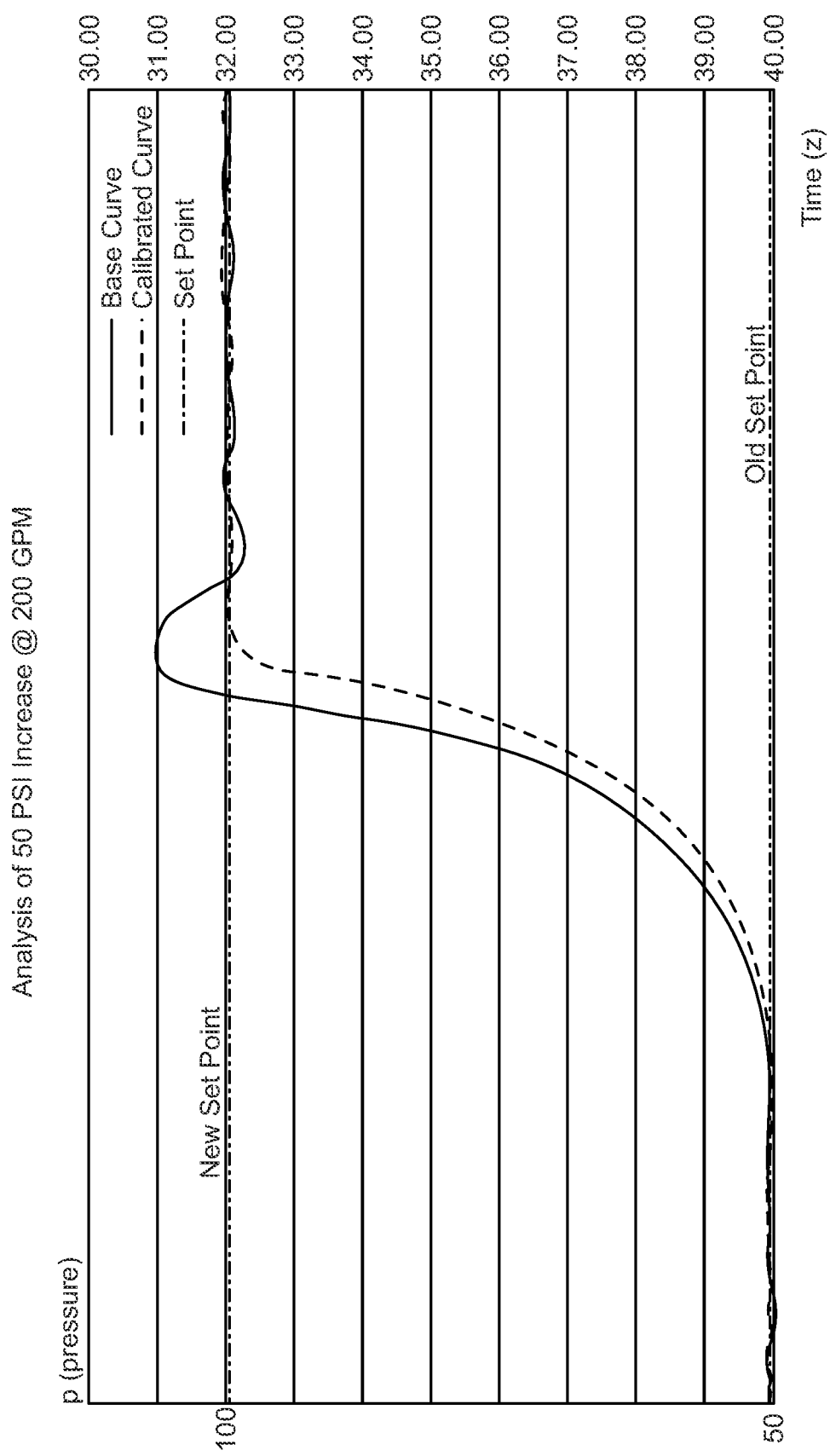
FIG. 10 is a graph showing the analysis of a 50 psi increase at 200 gpm.
Figure 11:
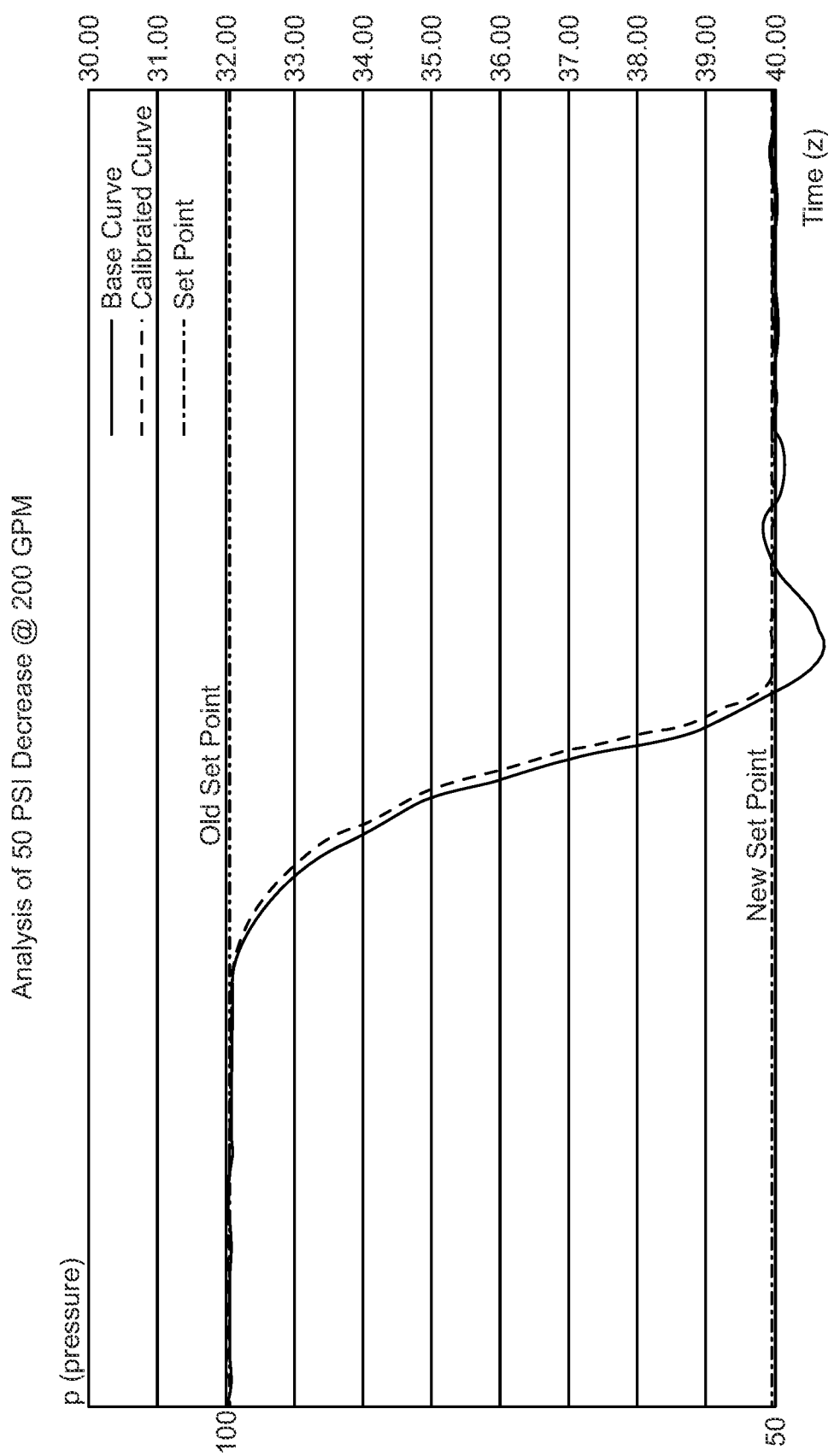
FIG. 11 is a graph showing the analysis of a 50 psi decrease at 200 gpm.

Referring to FIG. 10 and FIG. 11 we now describe step 4):
a) Using each of the averaged BASE P and I curves to provide the proportional gain and integral gain to be used by the PID controller at a given operating condition, the desired pressure setpoint is increased in 50 psi increments from the old set point to the new set point, noting over shoot and undershoot of the resulting measured pressure variable in both directions for each step.

b) Adjustments are then made to the BASE P and I curves used in determining the gains used by the PID controller, by adjusting P and I manually in real time until the desired accuracy of maximum deviation between desired pressure setpoint and measured pressure variable of +/−5 psi was reached, and recorded to the control loop, to limit overshoot and undershoot to +/−5 psi for each 50-psi step.

5) This was performed for each flow rate step Q based on the number of steps (n) determined in Step 1) of the calibration.
a) based on the comprehensive results of the multi stage testing these control curves were derived for the P&I values of the control loop,
b) the control curves were compared across the range of tests and averaged values were utilized to derive a control characteristic curve for both P and I values that would change over the 0-100% range based on the actuator performance and current position of the pressure curve.

Figure 12:
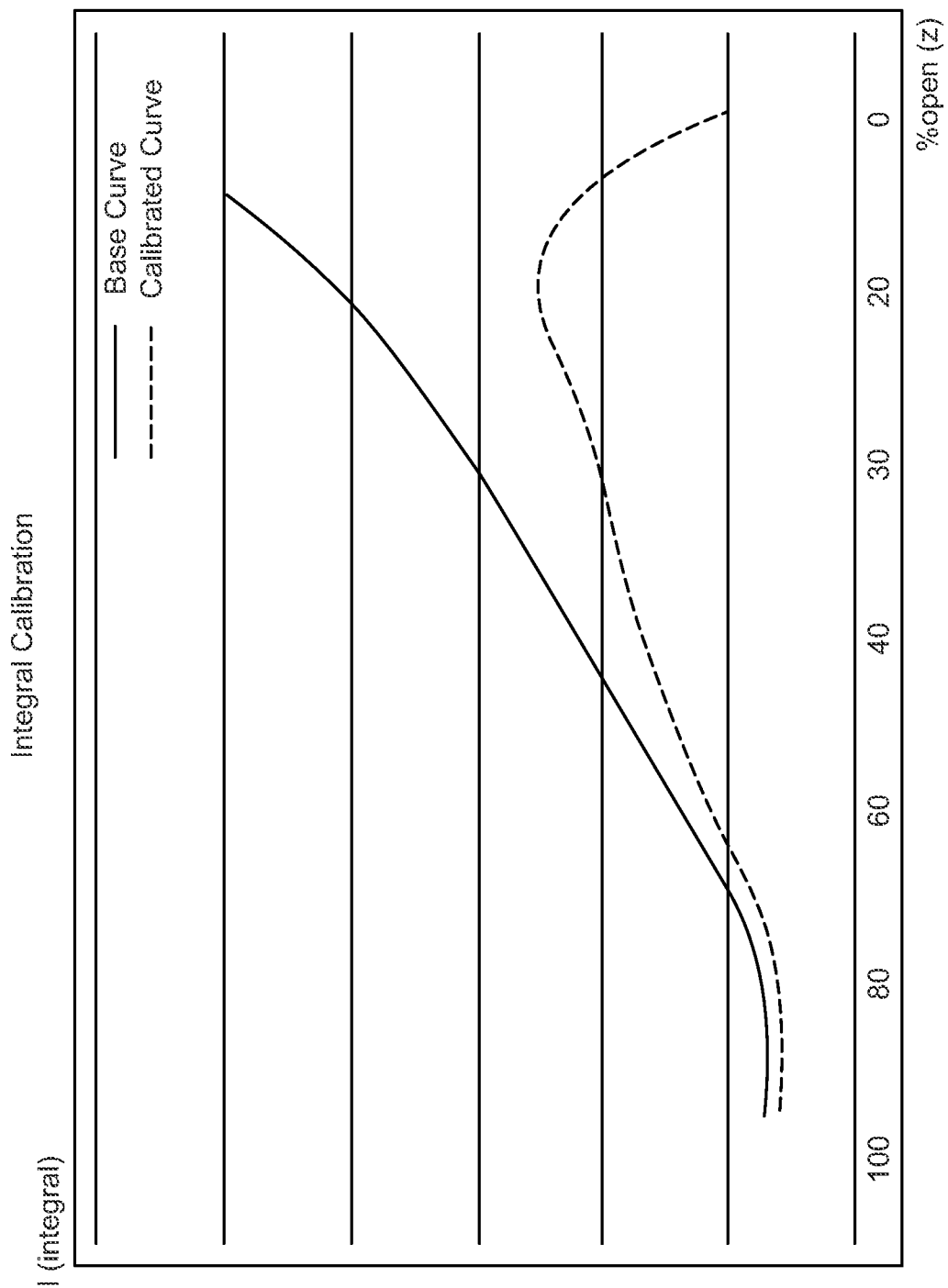
FIG. 12 is a graph showing the integral calibration

Referring to FIG. 12, the final resultant calibrated curve for the integral gain can be seen by plotting the integral gain (I) versus % Open (z). It can be appreciated that the characteristic of this curve is significantly different from the BASE I curve for the integral gain illustrated in FIG. 9 and shown in FIG. 12 in solid line.

Figure 13:
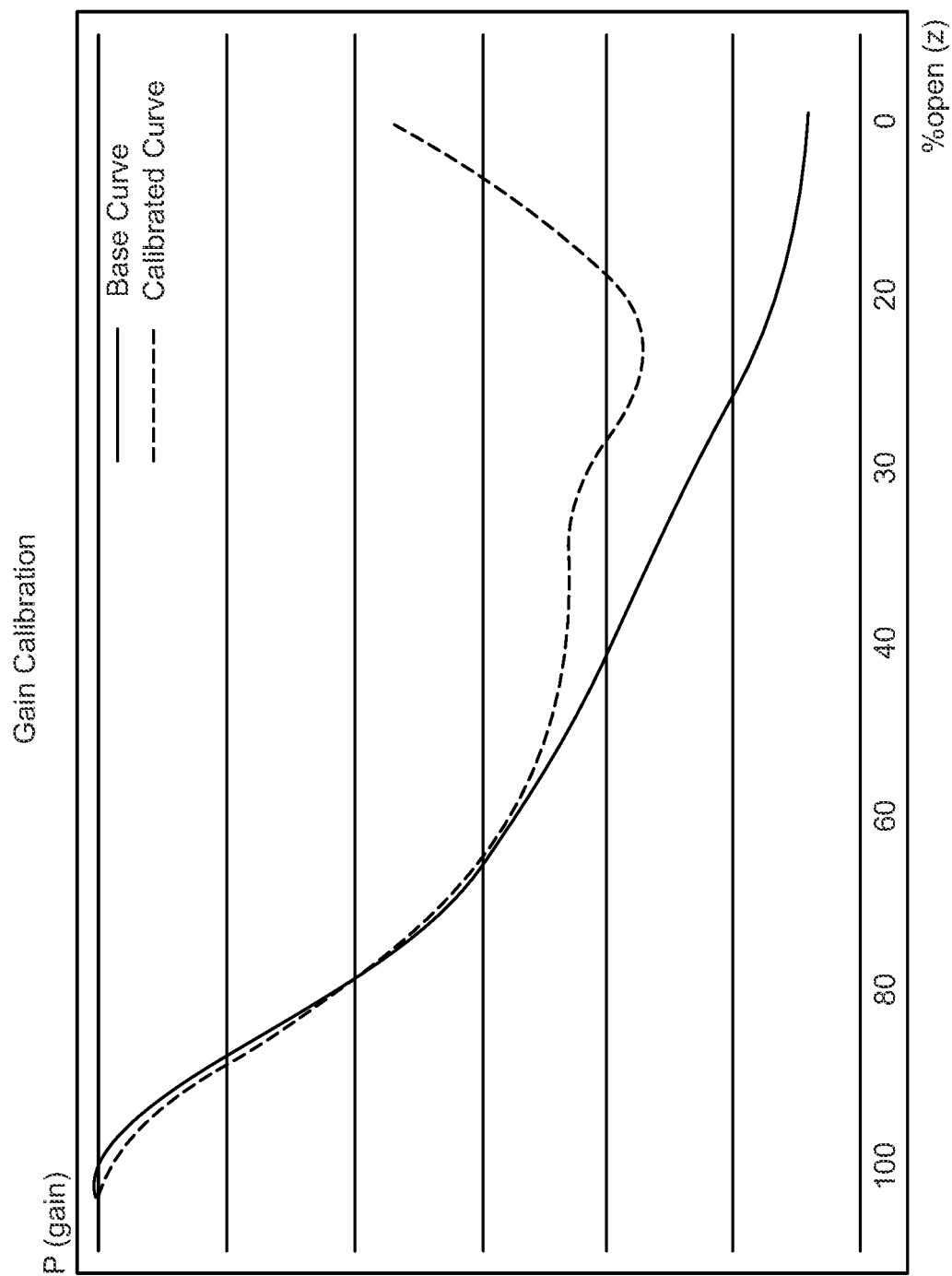
FIG. 13 is a graph showing the gain calibration

Similarly, referring to FIG. 13 the final calibrated curve for the proportional gain (P) is significantly different from the BASE P curve illustrated in FIG. 8 and shown in solid line in FIG. 13, as it has incorporated all of the variables tested for by increasing and decreasing set points.

Once calibrated, the entire choke system, including the plug choke body, choke plug, gearbox actuator and positioner can be used to control the fluid pressure in a wellbore by mounting it in a return line of a drilling system, the return line providing a conduit for fluid exiting the wellbore. The plug choke body is mounted in the return line so that the central flow passage of the plug choke body forms part of the return line and fluid returning from the wellbore enters the plug choke body via the inlet. For example, the choke system could be mounted directly on the outlet of a rotating control head. The positioner is connected to an electronic controller or PLC, which has a memory and which is programmed with a PID algorithm to operate as a PID controller and to send to the positioner electrical control signals representing the desired position of the choke plug. A flow meter and pressure sensor are provided at the inlet and are connected to the PLC to provide to the PLC an electrical flow signal representing the rate of flow of fluid at the inlet and an electrical pressure signal representing the fluid pressure at the inlet. The PLC also an input for receipt of an electrical signal representing the pressure setpoint. This input could be connected to a manual input device by means of which an operator may manually enter the pressure set point, or to a drilling controller which uses drilling control software automatically to generate the pressure setpoint, or both.

The calibrated P curve and the calibrated I curve are stored in the PLC memory and the PLC is programmed to use these, in combination with the flow rate and pressure information received from the flow meter and pressure sensor, to select the appropriate proportional gain and integral gain to be used in the PID algorithm in determining the control signal to be sent to the positioner whenever there is a deviation of the measured pressure from the setpoint pressure during a drilling operation.

As the calibration method includes all the combined characteristics of the full system: choke body bore, choke plug profile, gearbox, actuator and positioner. It accounts for hysteresis, backlash, overshoot and undershoot that could occur at and in different magnitudes over the full control curve of the complete system. As such, it provides a superior method for elegant choke control with a "system specific calibration curve with a system and process specific gain schedule" that can be programmed into the PLC.

Any onsite variations like wellbore storage or other can now be easily adapted into such a calibrated control system as the underlying holistic system calibration is of a sound and empirical nature.

What is claimed is:

1. A drilling system comprising a drill string which extends into a wellbore to form an annular space in the wellbore around the drill string, a return fluid flow conduit which is connected to the annular space, and a choke system comprising a choke having an inlet and an outlet, a central flow passage which extends between the inlet and outlet, and a plug which is rotatable about an axis of rotation to vary the degree to which fluid flow along the central flow passage is restricted, the choke system further comprising an actuator which is operable to rotate the plug to vary the degree to which fluid flow along the central flow passage is restricted, the plug being movable between a closed position in which the plug substantially prevents flow of fluid along the central flow passage and an open position in which flow of fluid along the central flow passage is restricted by the plug to a minimum extent, the choke being mounted in the return fluid flow conduit so that the central flow passage forms part of the return fluid flow conduit and fluid returning from the wellbore enters the choke system at the inlet, the plug being provided with a plug passage which has a first end and a second end and which is arranged so that when the plug is in its open position, fluid can pass along the central flow passage of the choke from the inlet to the outlet of the choke via the plug passage from the first end of the second end of the plug passage, wherein the plug is provided with a removable plug insert which surrounds the second end of the plug passage, the plug insert being made from a harder material than the rest of the plug.

2. A drilling system according to claim 1 wherein the plug is shaped such that the first end of the plug passage is substantially the same size and shape as the central flow passage at the inlet.

3. A drilling system according to claim 1 wherein the plug insert has an aperture which has an inner end which lies in a central portion between first end and second end of the plug passage and an outer end which lies at the second end of the plug passage, and the plug insert is configured such that the aperture has a smaller cross-sectional area at its outer end than at its inner end.

4. A drilling system according to claim 3 wherein the central flow passage has a generally circular transverse cross-section and the aperture at the outer end of the plug insert has a non-circular transverse cross-section.

5. A drilling system according to claim 4 wherein the aperture at the outer end of the plug insert is wedge shaped, having a front end, a tail end, a top edge and a bottom edge, the separation between the top edge and the bottom edge increasing from the front end to the tail end of the aperture.

6. A drilling system according to claim 5 wherein the aperture is oriented such that when the plug is rotated from its closed position to its open position, the front end of the aperture connects with the central flow passage first, with the tail end of the aperture being exposed to the central flow passage only as the plug reaches the open position.

7. A drilling system according to claim 1 wherein the plug is configured such that when rotated from its closed position towards its open position, initially the first end of the plug passage connects to the central flow passage at the inlet side of the choke whilst the second end of the plug passage is not connected to the central flow passage at the outlet side of the choke.

8. A drilling system comprising a drill string which extends into a wellbore to form an annular space in the wellbore around the drill string, a return fluid flow conduit which is connected to the annular space, and a choke system comprising a choke having an inlet and an outlet, a central flow passage which extends between the inlet and outlet, and a cylindrical plug having a longitudinal cylinder axis, which is rotatable about the longitudinal cylinder axis to vary the degree to which fluid flow along the central flow passage is restricted, the choke system further comprising an actuator which is operable to rotate the plug to vary the degree to which fluid flow along the central flow passage is restricted, the plug being movable between a closed position in which the plug substantially prevents flow of fluid along the central flow passage and an open position in which flow of fluid along the central flow passage is restricted by the plug to a minimum extent, the choke being mounted in the return fluid flow conduit so that the central flow passage forms part of the return fluid flow conduit and fluid returning from the wellbore enters the choke system at the inlet, the plug being provided with a plug passage which has a first end and a second end and which is arranged so that when the plug is in its open position, fluid can pass along the central flow passage of the choke from the inlet to the outlet of the choke via the plug passage from the first end of the second end of the plug passage, wherein the plug is provided with a removable plug insert which surrounds the second end of the plug passage, and further comprising a removable downstream insert and upstream insert which surround and engage with the plug to provide bearing surfaces for rotation of the plug relative to a choke body, the upstream insert engaging with the plug at the inlet side thereof and the downstream insert engaging with the plug at the outlet side thereof, wherein the downstream insert is made from a softer material than the plug insert.

9. A drilling system according to claim 8 wherein the choke has the choke body which encloses the central flow passage, and a removable lid which is releasably secured to the choke body, the plug being mounted for rotation in the choke body about its longitudinal cylinder axis, a first end portion of the plug being supported by the choke body, and a second end portion of the plug being supported by the lid.

10. A drilling system according to claim 8 wherein the upstream and downstream insert together form a split tube with a radially inwardly facing surface which encloses a cylindrical space, and a tapered radially outwardly facing surface.

11. A drilling system comprising a drill string which extends into a wellbore to form an annular space in the wellbore around the drill string, a return fluid flow conduit which is connected to the annular space, and a choke system comprising a choke having an inlet and an outlet, a central flow passage which extends between the inlet and outlet, and a cylindrical plug having a longitudinal cylinder axis, which is rotatable about the longitudinal cylinder axis to vary the degree to which fluid flow along the central flow passage is restricted, the choke system further comprising an actuator which is operable to rotate the plug to vary the degree to which fluid flow along the central flow passage is restricted, the plug being movable between a closed position in which the plug substantially prevents flow of fluid along the central flow passage and an open position in which flow of fluid along the central flow passage is restricted by the plug to a minimum extent, the choke being mounted in the return fluid flow conduit so that the central flow passage forms part of the return fluid flow conduit and fluid returning from the wellbore enters the choke system at the inlet, the plug being provided with a plug passage which has a first end and a second end and which is arranged so that when the plug is in its open position, fluid can pass along the central flow passage of the choke from the inlet to the outlet of the choke via the plug passage from the first end of the second end of the plug passage, wherein the plug is provided with a removable plug insert which surrounds the second end of the plug passage, wherein the choke has a choke body which encloses the central flow passage, the plug being mounted for rotation in the choke body, and a removable bore insert which is mounted in the choke body around the outlet, wherein the choke further comprises a separate removable downstream insert which is mounted in the choke body to engage with the plug at the downstream side thereof, the downstream insert being adjacent the bore insert and between the bore insert and the plug so that the downstream insert and bore insert surround the central flow passage at the outlet side of the plug.

\* \* \* \* \*